United States Patent

[11] 3,621,276

[72] Inventor Cyril John Mitchell
5 Weycrofts, Bracknell, England
[21] Appl. No. 59,470
[22] Filed July 30, 1970
[45] Patented Nov. 16, 1971
[32] Priority Aug. 2, 1969
[33] Great Britain
[31] 38,829/69

[54] ELECTRIC TIMING CIRCUITS
1 Claim, 1 Drawing Fig.

[52] U.S. Cl. .......... 307/141, 317/36 TD, 340/256
[51] Int. Cl. .......... H02h 7/20
[50] Field of Search .......... 307/94, 141, 293, 294; 317/33 R, 36 TD, 142 S; 323/15; 340/256; 320/31, 38, 40

[56] References Cited

UNITED STATES PATENTS

| | | | |
|---|---|---|---|
| 3,192,449 | 6/1965 | Brockett | 317/142 S |
| 3,287,608 | 11/1966 | Pokrant | 317/142 S |
| 3,153,176 | 10/1964 | Clay | 317/148.5 TD |
| 3,493,790 | 2/1970 | Lundin | 307/293 |

*Primary Examiner*—A. D. Pellinen
*Attorney*—Wenderoth, Lind & Ponack

ABSTRACT: An electric timing circuit to prevent the battery of a test instrument from being discharged if the instrument is left switched on when not in use. An amplifier and a capacitive element connected across the input circuit of the amplifier so that when the battery is connected across the capacitive element, the capacitive element charges up to effect closure of a current path through the circuit, and when the battery is disconnected from across the capacitive element, the capacitive element discharges thereby breaking the current path through the circuit after an interval determined by the rate of fall of the voltage across the capacitive element.

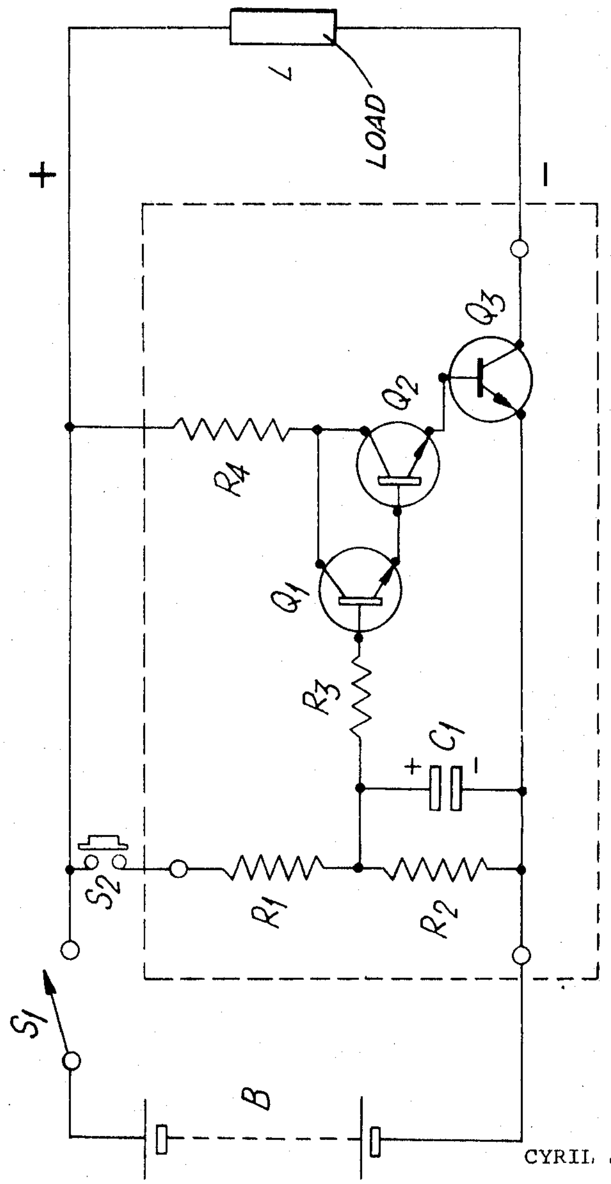
CYRIL JOHN MITCHELL,
*Inventor*
By Wenderoth, Lind and Ponack Attorneys

ELECTRIC TIMING CIRCUITS

This invention relates to electric timing circuits.

According to the present invention an electric timing circuit includes an amplifier comprising first and second junction transistors of like conductivity type each having a base, an emitter and a collector electrode, the collector electrodes of the first and second transistors being directly connected together, the emitter electrode of the first transistor being directly connected to the base electrode of the second transistor, the base electrode of the second transistor, the base electrode of the first transistor being connected in the input circuit of the amplifier, and the emitter electrode of the second transistor being connected in the output circuit of the amplifier; a capacitive element connected across the input circuit of the amplifier; and a third junction transistor, of the same conductivity type as the first and second transistors, and having a base, an emitter, and a collector electrode, the base electrode of the third transistor being directly connected to the emitter electrode of the second transistor, the arrangement being such that when an electric supply of predetermined voltage is connected across the capacitive element, the capacitive element charges up and the third transistor is rendered conductive, and when the supply is disconnected from across the capacitive element, the capacitive element discharges at least in part by way of the base electrode of the first transistor, and the third transistor is rendered nonconductive after an interval determined by the rate of fall of the voltage across the capacitive element.

Preferably the first, second, and third transistors are NPN-type junction transistors.

The third transistor can be used as a switch, the emitter-collector path of the third transistor being connected in a supply lead from a voltage source to a load.

One embodiment of an electric timing circuit in accordance with the present invention will now be described by way of example with reference to the accompanying drawing, which is a circuit diagram of an arrangement for protecting the battery of a portable electric test instrument from being completely discharged through the instrument being left switched on when not in use.

As shown in the drawing, the circuit includes an amplifier comprising two NPN junction transistors $Q_1$ and $Q_2$ having their collector electrodes directly connected together, and connected by way of a resistor $R_4$ to a positive supply lead. The emitter electrode of the transistor $Q_1$ is directly connected to the base electrode of the transistor $Q_2$. The emitter electrode of the transistor $Q_2$ is directly connected to the base electrode of a third NPN junction transistor $Q_3$, the emitter-collector path of the third transistor $Q_3$ being connected in a negative supply lead. A series arrangement of a pushbutton switch $S_2$ and two resistors $R_1$ and $R_2$ is connected between the positive and negative supply leads, the junction between the resistors $R_1$ and $R_2$ being connected by way of a resistor $R_3$ to the base electrode of the transistor $Q_1$. A capacitor $C_1$ is connected between the junction between the resistors $R_1$ and $R_2$ and the negative supply lead. A battery B is connected across the positive and negative supply leads, a switch $S_1$ being connected between the positive pole of the battery B and the positive supply lead. The positive and negative supply leads are connected to a load L.

In the rest state the switches $S_1$ and $S_2$ are open, the transistors $Q_1$, $Q_2$ and $Q_3$ are all nonconductive, and no power is supplied from the battery B to the load L. When the switch $S_1$ is closed, still no power is supplied from the battery B to the load L as the transistor $Q_3$ is nonconductive and thus serving as an open switch in the negative supply lead. If now the switch $S_2$ is closed, the capacitor $C_1$ charges up to the voltage of the battery B, and all of the transistors $Q_1$, $Q_2$ and $Q_3$ are rendered conductive, the transistor $Q_3$ becoming saturated. The transistor $Q_3$ is now functioning as a closed switch, and power is supplied from the battery B to the load L. When the switch $S_2$ is released to open, the voltage across the capacitor $C_1$ maintains the transistors $Q_1$, $Q_2$ and $Q_3$ conductive, and power continues to be supplied from the battery B to the load L. The capacitor $C_1$ now discharges at least in part by way of the base electrode of the transistor $Q_1$, and by way of the resistor $R_2$. When, after a certain interval the voltage across the capacitor $C_1$ falls to a certain value, the transistors $Q_1$, $Q_2$ and $Q_3$ are rendered nonconductive, the transistor $Q_3$ now again functioning as an open switch, and power ceases to be supplied from the battery B to the load L. If the switch $S_2$ is now again closed and released, the circuit effects a further cycle of operation as described above. Thus, although the switch $S_1$ remains closed, power is supplied from the battery B to the load L for a maximum continuous time determined by the rate of fall of the voltage across the capacitor $C_1$.

In one circuit as described above, the components had the following values:

| | |
|---|---|
| $R_1$=330 ohms | $R_4$=3.9 k. ohms |
| $R_2$=10 megohms | $C_1$=100 mfd. (electrolytic) |
| $R_3$=4.7 megohms | Battery (B) voltage=9 volts |

this circuit maintaining a supply of power from the battery B to the load L for approximately 30 minutes after the switch $S_2$ was opened. The current supplied to the load L from the battery B remained substantially constant until the voltage across the capacitor $C_1$ had fallen to 2 volts, the current supplied then decreasing until the voltage across the capacitor $C_1$ was 1½ volts, when substantially no current was supplied.

The time for which power is supplied from the battery B to the load L after the switch $S_2$ is opened can be increased by increasing the voltage of the battery B or by increasing the capacitance of the capacitor $C_1$.

If desired, the transistors $Q_1$, $Q_2$ and $Q_3$, and resistors $R_1$, $R_2$, $R_3$ and $R_4$ can be provided in integrated circuit form.

What is claimed is:

1. An electric timing circuit arrangement including an amplifier comprising first and second junction transistors of like conductivity type each having a base, an emitter and a collector electrode; means directly connecting the collector electrodes of the first and second transistors; means directly connecting the emitter electrode of the first transistor to the base electrode of the second transistor; means connecting the base electrode of the second transistor; means connecting the base electrode of the first transistor to one terminal of a capacitive element; a third junction transistor of the same conductivity type as the first and second transistors and having a base, an emitter and a collector electrode; means directly connecting the emitter electrode of the second transistor to the base electrode of the third transistor; means connecting the emitter electrode of the third transistor to the other terminal of the capacitive element; an output terminal connected to the collector electrode of the third transistor, a first input terminal connected to said other terminal of the capacitive element; a second input terminal and a network including a switch, said network being connected between the first and second input terminals and connected to said one terminal of the capacitive element to provide a predetermined voltage across the capacitive element.

* * * * *